Stockton & St. John,
Motor.
Nº 77,674. Patented May 5, 1868.
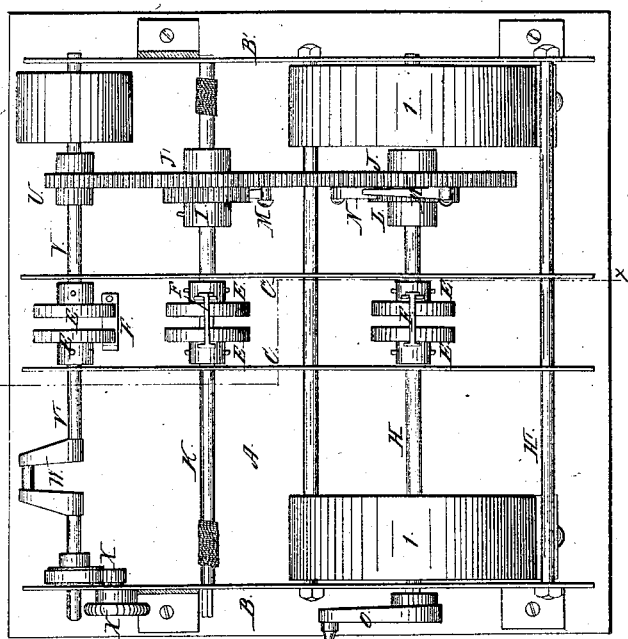
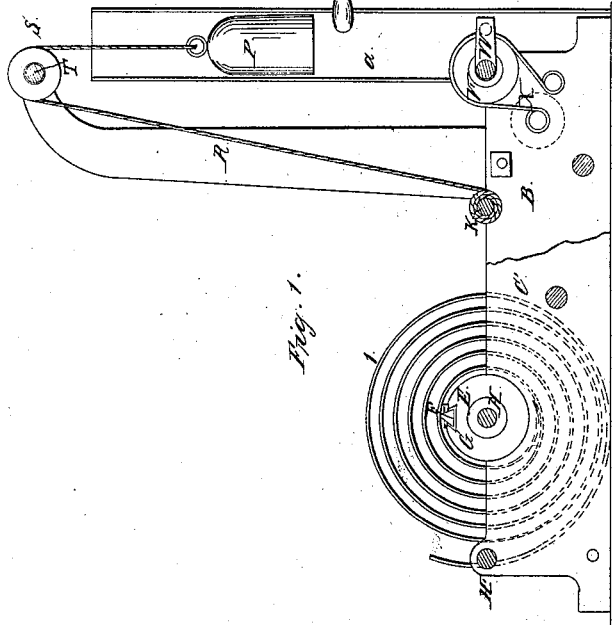
Witnesses:
Geo H Strong
I Dennis Jr
Inventors:
Edward Stockton
William O St John
By his Attys Dewey &c

United States Patent Office.

EDWARD STOCKTON AND WILLIAM O. ST. JOHN, OF FOLSOM, CALIFORNIA.

Letters Patent No. 77,674, dated May 5, 1868.

IMPROVEMENT IN APPARATUS FOR PRODUCING MOTIVE-POWER.

*The Schedule referred to in these Letters Patent and making part of the same.*

TO ALL WHOM IT MAY CONCERN:

Be it known that we, EDWARD STOCKTON and WILLIAM O. ST. JOHN, of Folsom, county of Sacramento, State of California, have invented an Improved Motive-Power; and we do hereby declare the following description and accompanying drawings are sufficient to enable any person skilled in the art or science to which it most nearly appertains to make and use our said invention or improvements without further invention or experiment.

Our invention relates to that class of machines for obtaining motive-power by the employment of springs, weights, wheels and pulleys, for driving windmills, pumps, threshing-machines, turning grindstones, sawing wood, churning, raising weights, and supplying power for other purposes; and consists in attaching steel springs to a shaft placed transversely across a frame which is permanently attached to a bed.

Two other shafts are also placed transversely across the frame, the spring-shaft and centre-shaft being geared together and operated by toothed wheels.

The outside or front of the two shafts above named is a driving-shaft, and is engaged by the teeth on the gear-wheel of the centre-shaft. This shaft has a pulley at one end, and a crank near the other end. To the centre-shaft are attached cords or chains, passing over grooved wheels, which are attached to a roller which is suspended above the machine.

The centre and spring-shafts are provided with keys, for winding up the springs and drawing up the weights. Ratchet-wheels, provided with pawls, are placed upon the shafts beside the two toothed wheels, which prevent the springs and weights from running down and unwinding, except by the operation of the driving-shaft.

To more fully illustrate and describe our invention, reference is had to the accompanying drawings, and the letters marked thereon, of which—

Figure 1 is a side sectional elevation, taken through $x\ x$, fig. 2.

Figure 2 is a plan.

A represents the bed, to which the frame B B' C C' is anchored. Transverse rods, with collars between the sections of the frame, serve to keep it firmly together, by set-screws or nuts. We would recommend for the frame the use of iron plate, of suitable thickness, set on edge.

The spring-shaft and the weight-shaft and the driving-shaft are placed transversely across and have their bearings on the frame, and are divided in their centres, and connected by couplings, E E E, held by bevelled keys, F F F, placed in slots G G G, so that one-half of the machine may be used separately. To both ends of the spring-shaft, H, are attached flat springs I I, their opposite ends being fastened to the transverse rod H'.

Toothed wheels J J are geared to one or both sections of the spring-shaft H and the weight-shaft, K, and turn independently of the said shafts. Ratchet-wheels L L are placed at one side of the toothed wheels, and are provided with pawls N N, kept in place by small springs M M. By this device the shafts are kept from turning back, except when the machine is in motion, but the toothed wheels turn independently on their shafts.

The ends of the spring-shaft and weight-shafts are made so that a key or crank, O, may be applied to them, to turn up the springs and draw up the weights. The weights, P P, are attached to the weight-shaft by cords R R, which pass over grooved wheels S S' on the roller T, which is suspended above the machine.

These weights may operate in vertical boxes, $a$, placed in the well, so as to act as ventilators, and keep the well supplied with pure air from above, as the weights are raised and lowered.

The teeth on the wheel J' engage the teeth of the pinion U, placed upon the driving-shaft V V', at one end of which is a pulley for a belt, and near the centre of V' is a crank, W.

A brake, X, is placed at the opposite end of the driving-shaft, passing around a pulley, and attached to a knob, X', which controls the speed or stops the machine by turning the knob.

Having thus described our invention, what we claim, and desire to secure by Letters Patent, is—

1. The combination and arrangement of the springs I I, weights P P, and gears J J, said gears being so connected with their respective shafts that they remain stationary, while the shafts are turned to wind up the springs and weights.

2. The ratchet-wheels L L, for connecting the gears with the shafts, in combination with the couplings E E, substantially as and for the purposes described.

In witness whereof, we have hereunto set our hands and seals.

EDWARD STOCKTON. [L. S.]
WILLIAM O. ST. JOHN. [L. S.]

Witnesses for WILLIAM O. ST. JOHN:
   ALBERT G. TULLAR,
   JOHN L. WILLIAMS.

Witnesses for EDWARD STOCKTON:
   C. W. M. SMITH,
   GEO. H. STRONG.